Jan. 15, 1935.  A. P. WIEGAND  1,987,651

AIRCRAFT PROPELLER

Filed March 7, 1932  4 Sheets-Sheet 3

A. P. WIEGAND
INVENTOR
BY
ATTORNEY

Patented Jan. 15, 1935

1,987,651

UNITED STATES PATENT OFFICE 1,987,651

AIRCRAFT PROPELLER

Albert P. Wiegand, Pittsburgh, Pa.

Application March 7, 1932, Serial No. 597,156

35 Claims. (Cl. 170—163)

This invention relates to aircraft propellers and has for its objects a provision of a simple, strong, and reliable device of this character wherein the blades are mounted in the hub for angular adjustment about the blade-axis so as to control the pitch according to varying needs of the machine; the provision of new and improved mechanism for holding the blades against the centrifugal force produced by the rotation and also producing, opposing, and controlling their adjusting movement; the provision of new and improved expedients for connecting the different blades together to compel an equal adjusting movement of the different blades; the provision of mechanism whereby the adjusting movements of the blades can be effected either manually or, within predetermined limits, automatically, at the desire of the operator; while further objects and advantages of the invention will become apparent as the description proceeds.

In the drawings accompanying and forming a part of this application I have shown certain physical forms in which my inventive idea can be embodied, although it will be understood that these drawings are not intended as limiting but merely as explanatory of one embodiment of my invention.

The advantages of variability of blade-angle are well known, among which may be mentioned the constantly increasing necessity for quicker climbing due to use of progressively smaller landing fields; the reduction of fuel consumption amounting even as great as thirty to forty percent saving; the increased period possible between major overhauls of the motor, an increase sometimes as great as one hundred percent; and the greater life of the motor thereby secured. For each condition of propeller and motor there is a certain definite optimum speed at which the performance lines of the two intersect. The optimum speed of an internal combustion engine is rather high and its power and efficiency fall off rapidly below a given speed. The optimum speed of a propeller is whatever it is designed for according to its pitch and contour, although its efficiency is decreased with increasing speed and falls off very rapidly at peripheral velocities approaching or exceeding the speed of sound. Beside each different design of craft exhibits different propeller requirements due to its weight, air resistance, and wing angle, all of which features are included in the term "drag". Finally the performance of any propeller with any kind of craft is much modified according to the atmospheric pressure wherein it works. Variations in barometric pressure near the earth's surface are too small to exhibit any substantial effect, but with the increasing tendency to pursue commercial journeys at high elevations the difference becomes important. By means of artificial feeding of the engines adequate power can be obtained in an atmosphere too tenuous to support human life, but this is of no value unless the propeller can take hold of the atmosphere so as to utilize that power.

The problem of producing a mechanical device which shall permit a change of the blade angle during operation is complicated by the necessity of retaining very great simplicity and strength in the construction of the propeller itself, especially in view of the great centrifugal force developed at maximum speeds which sometimes becomes as great as thirty tons per blade. Such a pressure renders ball-bearings useless since the balls themselves begin to break at pressures of about ten tons, and the usual types of gearing and bearing expedients are clearly infeasible under such conditions, yet the adjusting features must not be of such character as in any wise to impair the size, shape, or utility of the device nor unduly increase its weight or complexity; it must not require any change in the motor; and the adjusting provisions must be of such a nature that even though completely destroyed or rendered inoperative the propeller shall still exhibit a workable margin of utility.

Figure 9:
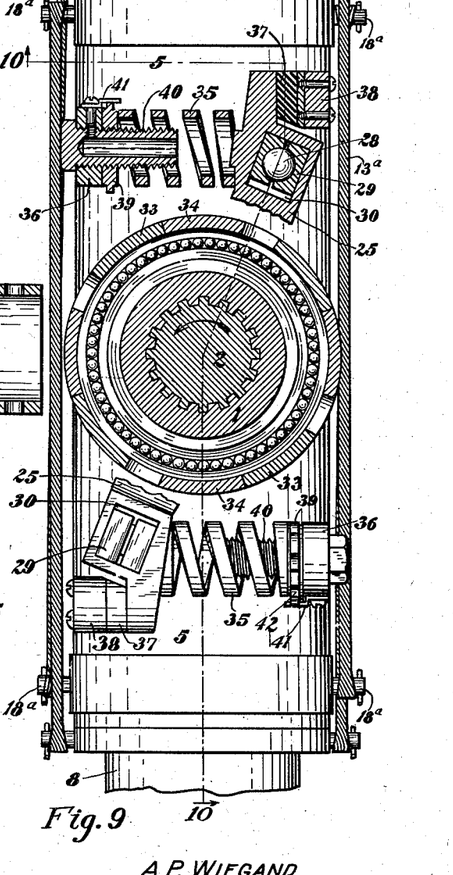
Fig. 9 is a front elevational view partly in section of a modified construction of adjustable propeller corresponding to the line 9—9 of Fig. 10.
Figure 10:
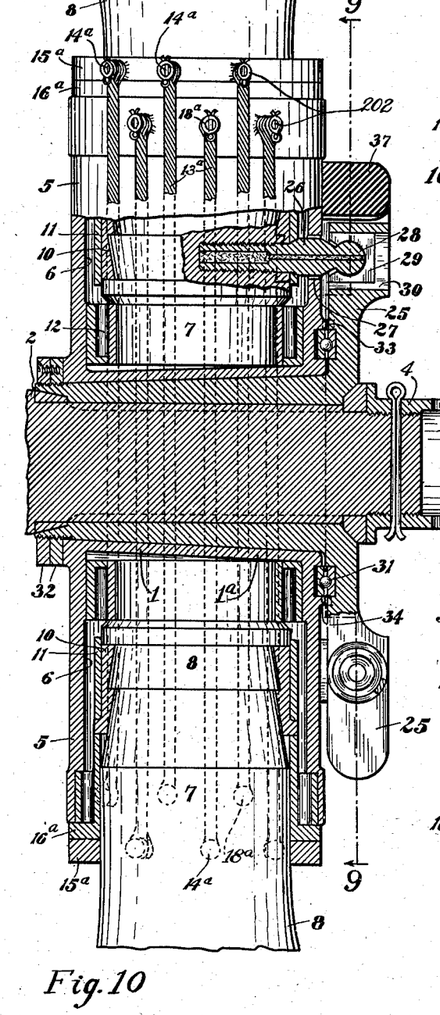
Fig. 10 is a side elevation partly in section of the propeller shown in Fig. 9, taken substantially along the broken line 10—10 of Fig. 9.

My improved propeller comprises a hub having a sleeve 1 adapted to be tightly secured to the shaft 2 of the engine 3 in any suitable manner as by the nut 4 working in conjunction with a key (not shown) or with splines as shown in Figs. 9 and 10. Projecting radially from this hub in opposite directions are integral, hollow arms 5—5 defining sockets 6 in which are rotatably mounted the shank-portions 7 of the blades 8. Each shank is provided with an anti-friction bearing which may be attached thereto in any suitable or desired way, provided however that it have no thrust-opposing friction for which no known anti-friction bearing is capable. In the present embodiment I have shown blades having their shanks notched at 9 for the reception of a split bushing 10, the halves of which are secured together by means of a longitudinally-applied, cylindrical, one-piece sleeve 11 which is slid lengthwise thereover, after which the sleeve and shank are movably supported by means of roller bearings 12—12 of a type to permit both rotational and longitudinal movement. Disruption of the propeller by ejection of the blades due to centrifugal force is prevented by the external tension members 13 which are suitably secured to the blades in motion-resisting relation with their axes preferably parallel to the socket axes when in position of maximum angularity. In the form here shown each of these tension members consists of a bundle of piano wires wound with a protecting wire cover, each tension member in the embodiment shown in Figs. 3 to 8 inclusive, having one end looped about a bushing 200 rotatably supported by a radial stud 14 rigidly mounted on a ring 15 which is adjustably seated upon the terminal flange 16 of the sleeve 11.

Figure 6:
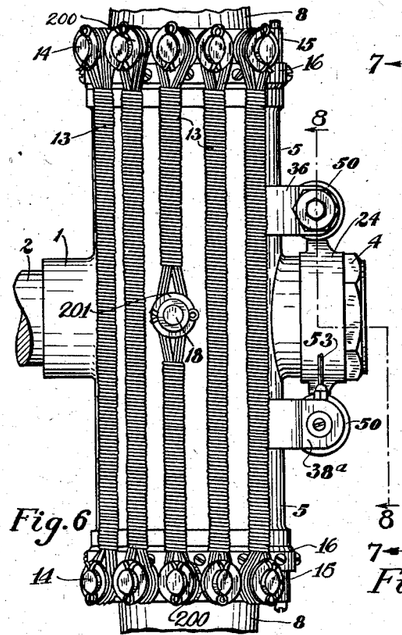
Figure 7:
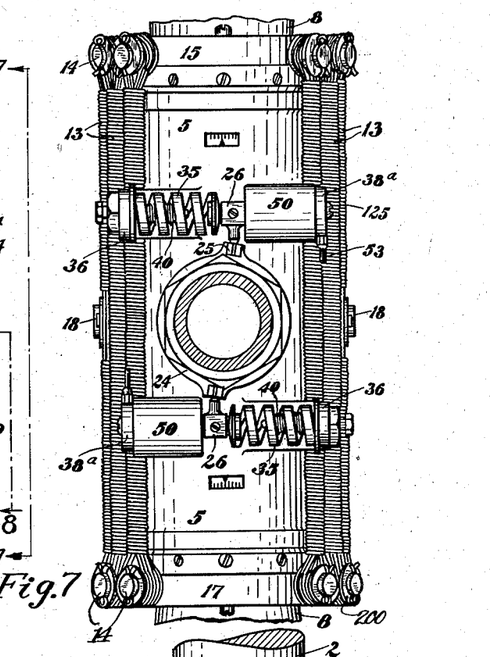
Fig. 7 is a front elevation of the propeller shown in Figs. 5 and 6.

In the form shown in Figs. 3 to 8 inclusive the opposite ends of said tension members are looped about similar bushings 200 rotatably supported by similar studs 14 rigidly mounted on a similar ring 15 surrounding the opposite blade-shank; excepting that one of the tension members as shown in Figs. 6 and 7 is preferably affixed, intermediate its length, to a bushing 201 rotatably supported by a stud 18 rigidly mounted on the hub, as illustrated in Figs. 6 and 7 for a purpose to be hereafter described. In the form of the invention shown in Figs. 9 to 11, each tension member 13ª has one end looped to a bushing 202 rotatably supported by a stud 14ª, rigidly mounted on a ring 15ª as before, this ring in turn being seated against the end flange 16ª of the sleeve 11, but the opposite ends of the tension members 13ª that are carried by the ring 15ª, instead of being secured to the opposite blade are affixed to similar bushings 202 rotatably supported by similar studs 18ª rigidly mounted on the hub; both these constructions have their advantages, the first named construction exhibiting maximum strength together with increased restoring force, and the latter form exhibiting increased ease of adjustment combined with decreased adjustment angle; the latter form is also applicable to propellers having an odd number of blades.

Figures 3, 3A, 4, 5:
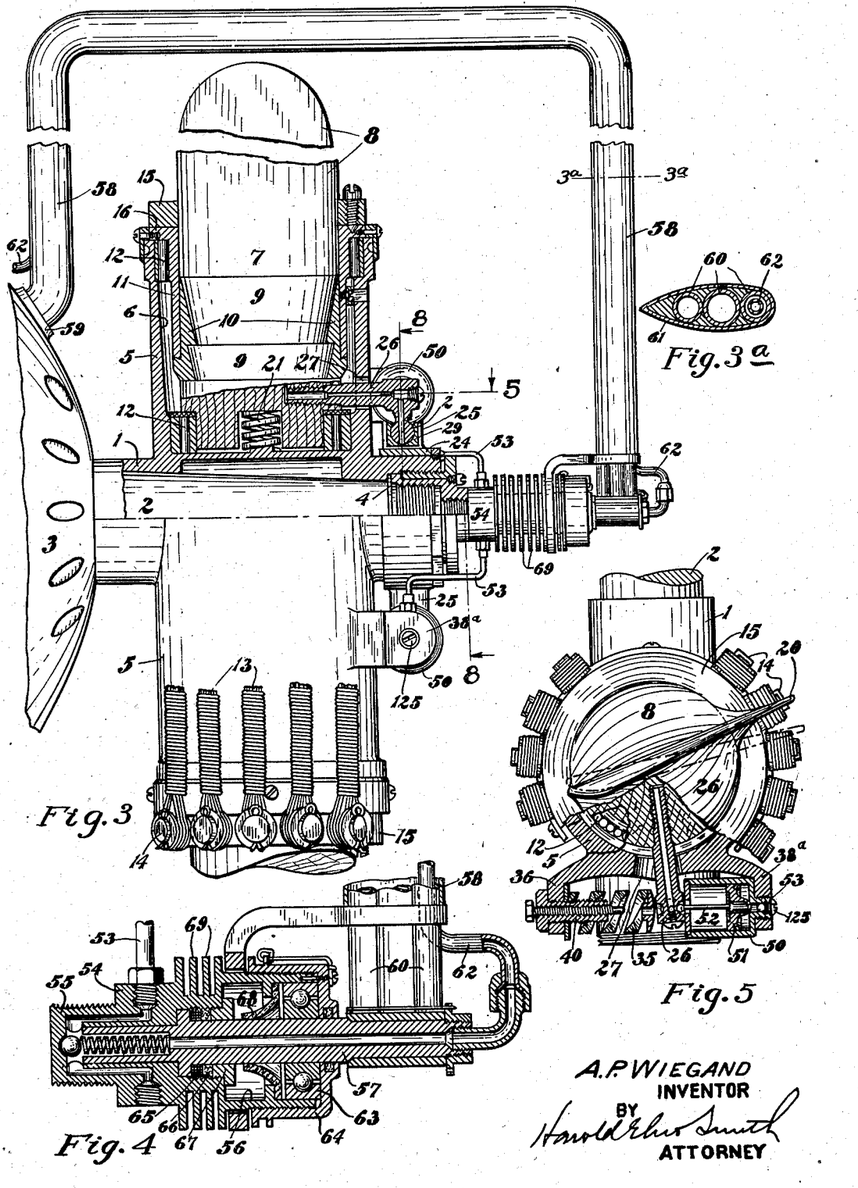
Fig. 3 is a side elevation of the propeller hub, together with part of the blades, engine, and the pressure-line bracket.
Fig. 3a is a sectional view on the line 3a of Fig. 3.
Fig. 4 is a longitudinal sectional view to enlarged scale showing the rotary gland.
Fig. 5 is a view partly in plan and partly in section of the blade and Fig. 6 is a side elevation of the propeller shown in Fig. 3.
Figures 8, 11:
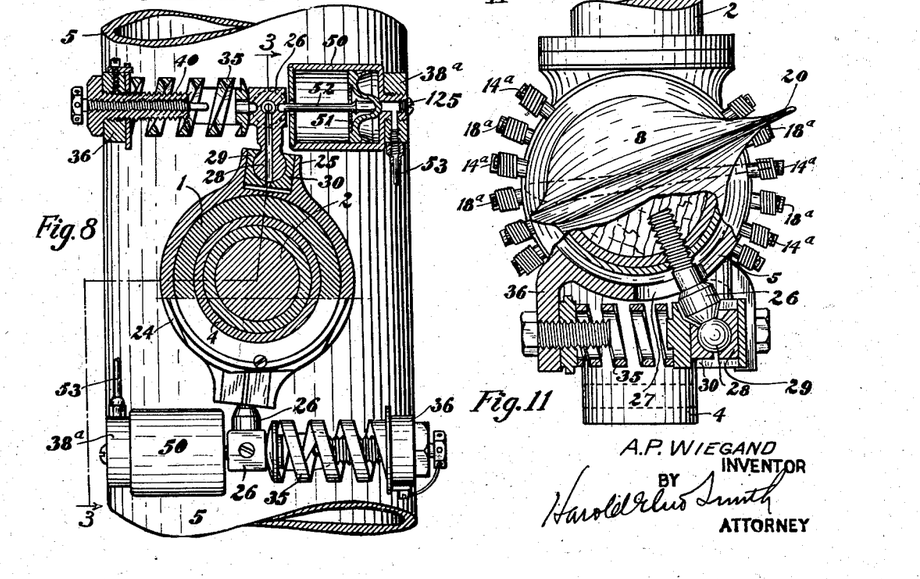
Fig. 8 is an enlarged sectional detail view corresponding to the broken line 8—8 of Figs. 3 and 6.
Fig. 11 is a top plan view of the propeller shown in Figs. 9 and 10 with parts shown in section.

Each of the blades 8 is made asymmetrical about its longitudinal axis, its trailing edge being further from said axis than the advancing edge as shown at 20 in Figs. 5 and 11, so that the unbalanced pressure thereon due to the thrust of the propeller tends always to rotate the blade in its socket, which rotation tends to produce an angular inclination of the tension members 13 relative to the blade axis; this inclination is opposed by one component of the centrifugal force produced by the rotation of the propeller. The result of this is that the blade angle tends to decrease automatically with increase of thrust, which is the desirable condition, this turning movement being opposed by the constantly increasing angularity of the tension members; and upon any increase in speed of the motor due for example to a change in the angle of flight of the craft, the increased centrifugal force tends to increase the blade angle which is the desired action. The amount of control securable in this way is rather limited. My tests show a movement of 1° to 1½° under practical conditions, which, though small, produces a noticeably improved performance. This construction is of substantial value by itself, but is of even greater value when conjoined with the manual control soon to be described by which its range is extended. In order to permit the necessary longitudinal movement of the blades to effect this adjustment the same are not bottomed tightly in their sockets. The attachment of one of the links to the hub as shown at 18 in Fig. 6 is primarily for the purpose of holding these blades equi-distant from the engine shaft. Springs 21 are preferably inset at the bottom of each blade-shank as shown in Fig. 3 to maintain the tension-members fairly taut while the propeller is at rest.

In order to compel the individual blades to turn simultaneously and in opposite directions I mount upon the exterior of each hub-sleeve 1 a rotatable ring 24 formed at opposite sides with projecting arms 25 which are operatively articulated to rigid radial studs 26 carried by the respective blade-shanks and projecting radially through slots 27 in the side-walls of the arms 5. In each of the embodiments here shown this stud is formed with a spherical head 28 which is received in a complementary cavity formed between the two similar members of a split-shoe 29 slidably mounted in a radial cavity 30 formed in the arm 25, thus affording a bearing surface of substantial area while permitting the necessary relative movement occasioned by rotation of one part relative to the other.

In the form of the invention shown in Figs. 9, 10, and 11, the arms 25, instead of being formed on a ring rotatable relative to, and supported by, the hub-sleeve 1, are carried by a sleeve 1ª which is integral with the arms 25, and the sleeve 1ª is rigidly keyed to the drive shaft 2, and rotatably supports the hub-sleeve 1, the latter being coaxial with the sleeve 1ª and the drive shaft 2. Suitable roller bearings 31 are interposed between the arms 25 and the adjacent hub sockets 5, to carry the propeller thrust, and retaining nuts 32 are disposed at the opposite end of the sleeve assembly. Relative rotation between the sleeves 1 and 1ª is limited to a comparatively small angle by means of complementary arcuate projections 33 and 34 carried by the two members respectively and each projecting into a cavity formed in the other member. According to both forms of the device strong springs 35 supported by suitable brackets 36 projecting from the socket-arms 5 are caused to act upon the studs 26, so as to rotate the blades, in a direction to increase the angle of the blades to a maximum position established by a suitable stop. In Figs. 5 and 8 these springs engage the studs 26 directly; in Fig. 9 these springs engage the arm 25. In Fig. 9 the stop consists of a rubber block 37 carried by a fixed arm 38 projecting from the socket-arm 5; in Figs. 3 to 8 this stop is combined with the liquid-pressure control devices. In the form of the device shown in Figs. 9–11, the drag or thrust of the blades tends to cause the rotation of the sleeve 1ª to lag behind that of sleeve 1 producing a torsion effect which compresses the springs 35, the force produced by such compression being adjustable by means of a spring-follower 39 mounted on a set-screw 40 carried by the arm 36 and located against accidental movement by a spring-dog 41 engaging suitable notches 42 in the periphery of the follower. The decrease in the blade-angle is opposed both by the action of the springs 35 and by the circumferential component of the centrifugal force produced by the obliquity of the tension-members 13ª; breakage of the springs 35 cannot in any case disable the propeller because the relative movement of the two sleeves will be prevented by engagement of the arms 25 with the screws 40 and also of the projections 33 with the projections 34.

In the form of the invention shown in Figs. 3 to 8, inclusive, springs 35 and arms 36 are likewise employed to oppose the rotation of the blades and to restore said blades towards their zero position, and set-screws 40 are provided by which to limit such movement; but in this embodiment I have shown a provision of fluid-pressure means, to assist the unbalanced air pressure upon the blade to decrease the thrust angle thereof as shown by the dotted lines in Fig. 5. With this end in view I interpose between the extremity of each stud 26 and the corresponding fixed arm 38ª a cylinder 50 and piston 51 adapted and arranged to oppose the action of the springs 35. In the present embodiment the cylinder 50 is carried by the arm 38ª and the piston-rod 52 is interposed between the piston and the stud 26. Suitable liquid-pressure conduits 53 connect these cylinders, through a suitable joint, with liquid-pressure devices under the control of the operator, which devices may be either manually or automatically controlled.

In the present embodiment the pistons 50—50 are located on that side of the propeller-hub which is turned away from the engine, the conduits 53 being affixed to a housing 54 having one end 55 screwed into a hollow projection of the nut 4, and having at its opposite end an axial recess 56 in which is swiveled a stationary hollow spindle 57 carried by the bracket 58 which embraces the propeller-disk and has its opposite end 59 rigidly secured to the engine 3 (or other fixed part of the aircraft). While this bracket can be made in any one of numerous ways I preferably form it of three steel pipes 60 of suitable size enclosed inside a casing 61 of approved shape from the air-resistance standpoint, one of the tubes having therein a fluid-pressure pipe 62 leading from the spindle 57 to the cockpit. The housing 54 and spindle 57 are connected for free rotational movement with minimum leakage, and numerous detailed constructions are undoubtedly possible. I have shown the employment of an anti-friction bearing 63 mounted in the end of the recess 56 in the housing 54, and leakage-preventing means consisting of an anti-friction metal-packing ring 65 working in company with an anti-friction sealing ring 66 (preferably non-metallic such as graphite) and a gland nut 67, backed up by a flexible washer 68. I have shown the exterior of the housing 54 as formed with a series of integral heat-dissipating or air-cooling flanges 69, it being necessary to provide for the dissipation of the heat generated when the parts are rotated relatively at speeds up to 3000 R. P. M. against a friction due to fluid-pressures up to five hundred pounds per square inch.

Figures 1, 1A:
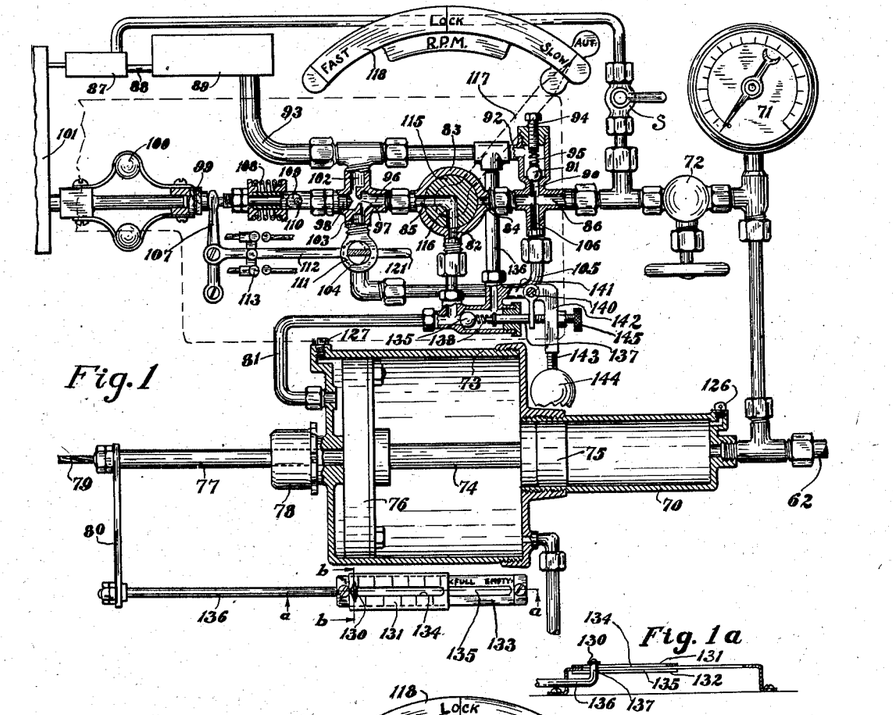
Fig. 1 illustrates a specimen cock-pit mechanism for the controlling of the blade-angle either automatically or manually according to the desire of the operator.
Figs. 1a and 1b are sectional views corresponding to the lines a—a and b—b respectively of Fig. 1.
Figures 1B, 2:
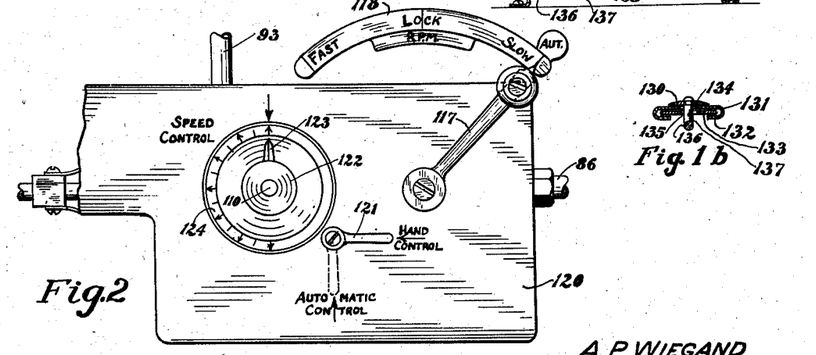
Fig. 2 is a face view of the casing indicated in dotted outline in Fig. 1.

For producing and varying this liquid-pressure, both manually and automatically I have provided the apparatus illustrated in Figs. 1 and 2. The pipe 62 is connected to a cylinder 70; and also, preferably to a pressure-gauge 71 and to a filling-valve 72. Coaxial with, and tandem-connected to the cylinder 70 is a larger cylinder 73 of the same length but of a substantially increased diameter, for example ten times the area. Secured to a common piston-rod 74 are leak-tight pistons 75, 76 fitting the smaller and larger cylinders respectively; and I have shown an extension 77 coaxial with the rod 74 projecting slidably through packing-glands 78 in the head of the larger cylinder for the attachment of an extension indicator connection 79 and side-arm 80, which will be described hereafter. Communicating with that end of the cylinder 73 which is furthest from the cylinder 70 is a pipe 81 whose opposite end is connected to the port 82 of the casing 83 of a three-way valve, said casing having two other ports 84 and 85 therein. The port 84 communicates with a passageway 86 leading from a constantly-operating liquid-pressure pump 87 operatively connected by means to the same engine 101 which drives the propeller. It is perfectly possible and within my invention to employ for this purpose the pump always provided with such engines for the pressure lubrication thereof; although it is equally within my invention to employ a special pump for the purpose. In either case said pump has an inlet-pipe 88 communicating with an oil reservoir or tank 89. I have also shown a shut-off valve S interposed between the pump 87 and the passageway 86 for the purpose of disconnecting the mechanism if desired. The valve 72 (which is invariably closed except upon the original filling of the apparatus) is shown as connected to the passage 86. Also communicating with the passage 86 is a passageway 90 leading to a spring-pressed-relief valve 91, the discharge passage 92 of which communicates with a pipe 93 which leads back to the same tank 89. By means of a set-screw 94 acting upon the spring 95 the pressure delivered to the mechanism is controlled.

The port 85 communicates with a passage 96 leading to a valve-seat 97 with which cooperates a reciprocable valve-member 98 which is operatively connected through the anti-friction thrust-bearing 99 with a centrifugal-governor 100, driven by suitable transmission mechanism 101 at a speed proportional to that of the propeller. This transmission mechanism 101 is indicated here conventionally since it may take any one of many forms, for example, pulleys and belts, a flexible shaft, intermeshing gearing, or better than all, a proportional electric drive. By whatever theory this operates it will be understood that the greater the speed of the propeller the greater the expansion of the governor balls, the latter being connected to the valve-member 98 so as to increase the opening of said valve with the increase of engine speed. The top face of the valve seat 97 communicates by means of a passageway 102 with the return pipe 93; while the passage 96 is connected by way of a passage 103 and casing 104 of a stop-valve to a pipe 105 leading to a passage 106, which joins the passage 86. In addition to the governor 100, the movement of the valve-member 98 is influenced by a latch-lever 107 and of a spring 108, said spring being under the control of a cam 109 carried by the shaft 110; and the rotary member of the valve 104 is provided with a cam 111 connected by means of a latch-rod 112 to the latch 107, so that whenever the valve 104 is moved to closed position the latch 107 is moved to open the valve 98 and hold it open despite any movement of the governor 100; and when, as here, the driving element for said governor consists of electric motor the operation of that motor is also preferably arrested by providing the arm 113 with contact braking elements 114 which stop the motor at the same time that the latch 107 comes into operation.

Located inside the valve-casing 83 is a movable valve-member 115 having a suitable passageway 116 therethrough, by means of which the port 82 can be connected selectively to either of the ports 84 or 85, or can be cut off from both; and operatively secured to this valve-member is a combined operating and indicating handle 117 having its free end swinging over a suitable indicating-segment indicated at 118. The valve and controlling mechanism above described are preferably enclosed in a sort of housing 120 located close to one elbow of the pilot. And projecting through the face of this casing are three handles, namely the handle 117 already described; the handle 121 connected to the valve 104 and cam 111; and a knob 122 connected to the shaft 110 and carrying a pointer 123 working over a circular dial 124 whereon different engine speeds are indicated. When the handle 117 occupies its right-hand position as shown in Figs. 1 and 2, the ports 82 and 85 are placed in communication and the mechanism is under automatic control; (assuming that the valve-handle 121 is moved to the dotted-line position shown in Fig. 2); when the handle 117 is moved to its left-hand position, the port 82 communicates with the port 84 which corresponds to an increased motor-speed; and when the handle 117 occupies an intermediate position, the port 82 is isolated and the blade-angle is held fixed. The manner together with the mode of filling and operating the mechanism will now be described:

We will assume the engine 3 to be running, thereby operating the pump 87 and rotating the propeller, but at low speed, the liquid-pressure controlling apparatus being empty. To fill the same with oil the handle 117 is set in the position herein indicated, and the valve 104 closed, thereby making sure that the pipe 81 communicates freely with the pipe 93. The valve S is assumed to be always open, being provided only for emergency. The filling valve is then opened and oil from the pump 87 flows into the system until it is as full as possible after which the valve 72 is tightly closed. Care must be taken by providing and operating suitable relief vents at proper points in the system (as at 125, Figs. 3, 5, 7 and 8; and 126, Fig. 1) that all air-bubbles are eliminated which would give elasticity to the fluid. The valves are maintained open until the cylinder 70 is completely filled, as well as the piping, the pistons 75 and 76 being thereby forced to the left-hand limit of their movement. As soon as the valve 72 is closed, the high-pressure side of the system is entirely isolated. The handle 117 is now moved to its other limit of movement so as to connect ports 82 and 84 long enough to fill the head of cylinder 73 with liquid, air bubbles being likewise discharged through the vent 127, which is afterwards tightly closed. The system is now in completely charged condition.

Wholly without regard to this liquid-pressure system the propellers hereinbefore described will exhibit a limited amount of automatic thrust-adjustment since increased thrust acting upon the trailing edge of the blade serves to some extent to twist the blades in their sockets against the tension of the members 13 and the opposition of the springs 35; however when this type of blade-control mechanism is employed I preferably adjust the propellers with a somewhat higher blade-angle than would otherwise be permissible, not great enough to render the propeller useless or stall the engine, but sufficient to give optimum performance in air of minimum density or craft movements of maximum velocity, which means that under low level cruising conditions the angle would be uneconomically high. With this arrangement and adjustment of parts, in order to obtain a quick take-off and a high climbing-angle it is necessary to decrease the blade-angle and increase the motor-speed. For this result the handle 121 is set at hand-control as shown in Figs. 1 and 2 which means that the valve 104 is closed, the valve 98 is widely opened, and the governor 100 rendered inoperative, after which the handle 117 is moved to the left-hand limit of its travel so as to connect the ports 82 and 84. The reason for closing the valve 104 is because while this is open the liquid pressure in the passage 86 may be anything down to zero, and decreases with the engine speed because of the escape of liquid through the valve-seat 97; but with this valve closed the pressure in the passage 86 rises to that determined by the spring 95. Hence when the handle 117 is moved to connect the ports 82 and 84 the piston 76 is moved towards the right as long as the handle is held in that position, while the pressure in the cylinder 70 is intensified at ten-fold rate, thereby displacing the pistons 51 and reducing the blade-angles. As soon as this angle has been reduced to the point desired by the operator (a scale hereafter described shows this angle at all times), he moves the handle 117 to an intermediate position (here indicated by the word "Lock") thereby isolating the port 82, after which the blades hold their established position until the pressure on the pistons 51 becomes impaired by leakage, which, according to my experience, does not occur to any noticeable extent within one hundred hours of running. This then enables the pilot to concentrate his entire attention upon starting and rising. Upon reaching the desired cruising level, however, it becomes desirable to render the blade-angle automatically dependent upon the engine speed, thereby enabling the optimum relation to be maintained between blade-angle and engine-speed without the pilot's attention. Thus, if by reason of air currents or accidental manipulation of the controls, the aircraft should tend to move towards a lower level, the load on the motor is automatically decreased and the blade-angle is desirably increased in order to compensate, thus opposing the speed of the motor, and obtaining better fuel economy; while, conversely, if the craft should be caused to rise entailing increased labor on the motor, an automatic decrease of the blade-angle will speed up the motor and produce superior conditions of economy. To accomplish this the operator moves the handle 121 from the hand-control position to the automatic-control position, thereby opening the valve 104, and releasing the latch 107, and starting the governor operation; and he also rotates knob 122 to cause the pointer 123 to indicate the motor-speed desired, which changes the position of cam 109 and hence the pressure exerted by the spring 108. The consequence is that the valve 98 assumes a position dependent upon the joint effect of the governor 100 and the spring 108, thereby opening or closing passage 97. As the motor-speed decreases and the balls 100 collapse, the valve 98 approaches its seat, producing an increase of pressure in the passage 96, which causes more oil to enter the cylinder 73 and by consequence more oil to enter the cylinders 50—50, whereby the blade-angle is decreased and some of the load lifted from the motor, which thereupon increases its speed; conversely, if the motor speed increases the balls 100 expand and the valve 98 is opened, thereby relieving the pressure in the cylinder 73, and allowing the tension of the members 13 assisted by the springs 35 to rotate the blades 8 towards a position of increased angularity.

Any internal combustion engine exhibits its optimum fuel economy at a definitely fixed speed and the performance falls off, sometimes rapidly at any deviation from that speed. Also the lower the speed of operation of the motor the longer will be its life. The operator sets both the motor throttle and the knob 122 so as to produce that speed which experience shows to be most advantageous. If the motor-speed is to be reduced the operator turns the knob 122 in a direction to increase the tension on the spring 108 which assists the opening of the governor and hence the opening of the valve 98; while to increase the speed he turns the knob 122 in the opposite direction, which decreases the tension on the spring 108 and allows the valve 98 to move nearer to closed position. The operator can at any instant take the propeller out from the control of the automatic apparatus by moving the handle 117 to intermediate position, and thereby maintain the blades at whatever position they have already assumed.

This position is indicated at all times by the pointer 130 working over the graduated scale-plate 131; and also if desired by a tell-tale (not shown) operated in any suitable manner by the extension member 79 which is provided for that purpose. However the scale plate 131 is preferably made after a peculiar manner to render its indications accurate despite accidental leakage from the system, since it should be remembered that the only connection between this scale-plate and the blades is through the fluid-pressure system so that the zero position will depend at all times upon the amount of the fluid in the system as well as upon the amount of displacement of the pistons 51. With this in view the scale here shown is made of an elongated metal plate having flanges 132 at its margin slidably embracing the margins of a longer plate 133. The plate 131 is formed with a longitudinal slot 134 registering with a longer slot 135 in the plate 133; and a rod 136 carried by the bracket-arm 80 (or connected to cable 79) is provided with an upturned end 137 extending through both slots and having the pointer 130 overlying the movable scale-plate. When the piston is moved to one end of its travel the pointer carries the scale plate therewith, but upon reverse retrograde movement of the piston the pointer leaves the scale-plate behind and hence at all times indicates the displacement of the blades from one of their extreme positions. Whenever the motor stops the blades always return to their position of maximum angularity, the springs 35 bottoming the pistons 51 in their respective cylinders and thus resetting the pointer 130 to the end of the scale. The amount of inaccuracy is only what can occur as a result of leakage during a single run and the highest I have observed is about 1° of blade angle in eight hours. The position of the scale-plate 131 relative to the fixed plate 133 also constitutes an indication of the amount of liquid in the system and thus avoids the danger that the same might become depleted without the pilot's knowledge.

It is not really of great importance to the pilot to know the blade angle since the engine-speed is the really important thing and the skillful pilot can sense the behavior of the mechanism without this indicator, but I have described this indicator as a refinement, sometimes desirable. This angle-indicator and also the gauge 71 constitute indicators as regards the integrity of the system since any falling off of the pressure shown by the gauge can only indicate some failure in the fluid system, although no possible failure thereof can serve to disable the craft.

The tandem cylinders 70—73 I term a pressure intensifier, and their utility is at least three-fold:

First, in enabling the employment of comparatively small cylinders and pistons on the propeller, since in the absence of high pressure the size and weight of the rotating parts would become prohibitive;

Second, to enable the valving operations to be effected by the handling of comparatively large quantities of fluid at comparatively low pressures, the large quantities producing accuracy of operation and the small pressure being readily controlled with minimum leakage; a third but minor advantage resides in the facility with which this small pressure can be produced as by employing the same pump always constituting a part of the engine itself.

By the use of a pressure-controlling valve 91 it becomes possible to secure the necessary fluid-pressure for the control of the propeller at very moderate engine-speed, and without impairing the ability of the pump to supply other parts of the engine at a higher pressure, while with the use of an intensifier as I have shown, pressures up to 500 lbs. per square inch are easily secured.

The pressure on the high-pressure side of the apparatus may, in certain circumstances, become so great as to need relief, which can conveniently be effected by providing a spring-pressed relief-valve 135 in the pipe 81, this valve being connected by a conduit 136 with the return-pipe 93. One situation in which this valve becomes desirable arises in a case where the aircraft is nosed down, the valve 115 being in the "Lock" position. Due to the increased centrifugal force upon the blades caused by the increase in speed, an increased pressure is induced in the cylinders 50 by reaction. I have utilized this relief-valve 135 in another way to afford additional automatic control, by providing the end of the valve-casing with a protruding plunger 137 pressing against the spring 138 by which the valve 135 is held to its seat. Pivoted to a horizontal stud 140 disposed transversely of the aircraft, and carried by the arm 141 of the valve-casing is a swinging lever 142 constituting an inclinometer-element and having a vertically depending part 143 on which is adjustably mounted a weight 144. An adjustable screw 145 presses against the plunger 137. The parts are so positioned that when the craft noses downwardly the screw 145 swings away from the plunger releasing at least in part the pressure on the spring 138 and not only preventing excessive pressures but allowing the blades to return to position of increased angularity.

It will be understood that the different features hereinbefore described exhibit varying degrees of importance and that some of them may be omitted and the rest employed without departing from the scope of my invention or losing the benefits of my improvements except in part. It will also be understood that numerous features I have described are capable of independent use or of modification one independently of another, such as that the tension members here described for holding the propeller parts against centrifugal force can be employed without means for adjusting the blades or with different means than those here described. Also that the equalizing yoke can be employed with other constructions or that the fluid pressure apparatus can be employed with other propeller constructions; or that the fluid-pressure apparatus can be employed with different control and adjusting means, either manual or automatic; and in general that I do not limit myself to any of the features of construction, arrangement, or operation here shown except as the same are specifically recited in my several claims which I desire may be construed each independently of limitations contained in other claims.

Having thus described my invention what I claim is:

1. Driving mechanism for aircraft comprising, a propeller having blades adapted to swivel to vary their pitch, a motor to drive said propeller, hydraulic mechanism associated with the propeller for varying the pitch of its blades, a hydraulic pump operatively connected to said motor, means, independent of said motor, for limiting the pressure produced by said pump, means for transmitting such limited pressure to said hydraulic mechanism, and a manually operated valve for admitting a controlled amount of liquid at such pressure to said hydraulic mechanism.

2. Driving mechanism for aircraft comprising, a propeller having blades adapted to swivel to vary their pitch, a motor to drive said propeller, hydraulic mechanism associated with the propeller for varying the pitch of its blades, a hydraulic pump operatively connected to said motor, means for limiting the pressure produced by said pump, means for transmitting such limited pressure to said hydraulic mechanism, a governor connected for operation at a speed proportional to the propeller speed, and means operated by said governor for controlling the pressure of the liquid admitted to said hydraulic mechanism.

3. Driving mechanism for aircraft comprising, a propeller having blades adapted to swivel to vary their pitch, a motor to drive said propeller, hydraulic mechanism associated with the propeller for varying the pitch of its blades, a hydraulic pump operatively connected to said motor, means for transmitting to said hydraulic mechanism a part of the hydraulic pressure produced by said pump, a governor connected for operation at a speed proportional to the propeller speed, and means for controlling the pressure of the liquid transmitted to said hydraulic mechanism, said last means being adapted to be actuated either manually or by said governor.

4. Driving mechanism for aircraft comprising, a propeller having blades adapted to swivel to vary their pitch, a motor to drive said propeller, hydraulic mechanism associated with the propeller for varying the pitch of its blades, a hydraulic pump operatively connected to said motor, means for transmitting to said hydraulic mechanism a part of the hydraulic pressure produced by said pump, a governor connected for operation at a speed proportional to the propeller speed, a valve for controlling the pressure of the liquid admitted to said hydraulic mechanism, means including a spring whereby said governor is connected to said valve, and means for manually adjusting the tension of said spring independent of said governor.

5. Driving mechanism for aircraft comprising, a propeller having blades adapted to swivel to vary their pitch, a motor to drive said propeller, hydraulic mechanism associated with the propeller for varying the pitch of its blades, a hydraulic pump operatively connected to said motor, means for transmitting to said hydraulic mechanism a part of the hydraulic pressure produced by said pump, a governor connected for operation at a speed proportional to the propeller speed, a valve for controlling the pressure of the liquid admitted to said hydraulic mechanism, means for connecting said governor to said valve in operating relation, means for manually rendering said governor inoperative, and means for thereafter admitting pressure liquid to said hydraulic mechanism under manual control.

6. Driving mechanism for aircraft comprising, a propeller having blades adapted to swivel to vary their pitch, a motor to drive said propeller, hydraulic mechanism associated with the propeller for varying the pitch of its blades, a hydraulic pump communicating with said hydraulic mechanism, a governor driven by the motor which drives the propeller, and means jointly under control of said governor and under manual control for regulating the pressure of the liquid in said hydraulic mechanism.

7. Driving mechanism for aircraft comprising, a propeller having blades adapted to swivel to vary their pitch, a motor to drive said propeller, hydraulic mechanism associated with the propeller for varying the pitch of its blades, a hydraulic pump communicating with said hydraulic mechanism, an inclinometer element, and means under control of said inclinometer element to regulate the pressure of liquid in said hydraulic mechanism in accordance with the fore and aft inclination of the aircraft.

8. Driving mechanism for aircraft comprising, a propeller having blades adapted to swivel to vary their pitch, a motor to drive said propeller, hydraulic mechanism associated with the propeller for varying the pitch of its blades, a hydraulic pump communicating with said hydraulic mechanism, a governor actuated by the motor which drives the propeller, means independent of the motor for limiting the pressure of the liquid supplied thereby to said hydraulic mechanism, a valve for further reducing the pressure of the liquid in said hydraulic mechanism, and operative connections from said governor to said valve.

9. Driving mechanism for aircraft comprising, a propeller having blades adapted to swivel to vary their pitch, a motor to drive said propeller, hydraulic mechanism associated with the propeller for varying the pitch of its blades, a hydraulic pump communicating with said hydraulic mechanism, a governor actuated by the motor which drives the propeller, means independent of the pump for limiting the pressure of the liquid supplied thereby to said hydraulic mechanism, and further means for reducing the pressure of the liquid in said hydraulic mechanism, said further means being adapted to be actuated either manually or by said governor.

10. Driving mechanism for aircraft comprising, a propeller having blades adapted to swivel to vary their pitch, a motor to drive said propeller, hydraulic mechanism associated with the propeller for varying the pitch of its blades, a hydraulic pump communicating with said hydraulic mechanism, a governor actuated by the motor which drives the propeller, means independent of the pump for limiting the pressure of the liquid supplied thereby to said hydraulic mechanism, an inclinometer element carried by said aircraft, and further means for reducing the pressure of the liquid in said hydraulic mechanism, said further means being adapted to be actuated either manually or by said governor or by said inclinometer element.

11. A variable pitch propeller having blades adapted to swivel to vary their pitch, yieldable means directly connected to said blades and normally tending to move them towards a position of maximum inclination, and means including a centrifugal governor operated at a speed proportional to the propeller speed for moving said blades towards a reduced inclination against the tension of said first means.

12. Driving mechanism for aircraft and the like comprising a propeller having its blades capable of swiveling movement about axes to vary their pitch, a hydraulic system of transmission to effect the movement of said blades about their axes, a governor operatively connected to said propeller for rotation at a speed proportional to the propeller speed and operating to control the hydraulic transmission mechanism and as a consequence the pitch of the blades in relation to the propeller speed, and means directly connected to said blades for restoring the pitch of the blades to its normal angle on failure of the hydraulic mechanism.

13. Driving mechanism for aircraft comprising a propeller having blades adapted to swivel to vary their pitch, an angularity indicator carried by said aircraft independently of said propeller, and hydraulic connections from said blades to said angularity indicator.

14. Driving mechanism for aircraft comprising a propeller having blades adapted to swivel to vary their pitch, hydraulic mechanism associated with the propeller for varying the pitch of said blades, hydraulic pressure producing means operatively connected to the engine which drives the propeller, means for controllably conveying to said propeller the pressure produced by said hydraulic means, and a visual indicator independent of said propeller, showing the amount of liquid in the system.

15. The combination with a variable pitch propeller having blades adapted to swivel to vary their pitch, a hydraulic device operatively connected to said blades and rotatable with said propeller to vary and fix the position of said blades about their axes, means operatively connected to the engine for producing hydraulic pressure, means for controlling said hydraulic pressure, conduit means connecting said controlling means to said hydraulic device, and a pressure intensifier included in said conduit means whereby the pressure transmitted to said hydraulic device is multiplied by a determined factor.

16. Driving mechanism for aircraft, comprising: a propeller having blades adapted to swivel to vary their pitch; a motor to drive said propeller; hydraulic mechanism associated with the propeller for varying the pitch of its blades; a hydraulic pump operatively connected to said motor and operating to produce hydraulic pressure to operate said hydraulic mechanism; means for transmitting to said hydraulic mechanism the hydraulic pressure produced by said pump, and comprising: manually controlled valve means operable in a first position to permit the full pressure developed by said pump to enter said hydraulic mechanism, whereby the pitch of said blades is varied to a determined angle, and operable in a second position to seal said fluid in said hydraulic mechanism holding said blades at said determined angle, and operable in a third position to permit fluid to enter said hydraulic mechanism; and automatically controlled valve means for controlling the pressure of fluid passing through said manually controlled valve means to said hydraulic mechanism, when in said third position, and thus automatically controlling the pressure exerted on said blades to vary their pitch.

17. Driving mechanism for aircraft comprising: a propeller having blades adapted to swivel to vary their pitch; a motor to drive said propeller; hydraulic mechanism associated with the propeller for varying the pitch of its blades; a hydraulic pump operatively connected to said motor and operating to produce hydraulic pressure to operate said hydraulic mechanism; means for transmitting to said hydraulic mechanism the hydraulic pressure produced by said pump, and comprising: manually controlled valve means operable in a first position to permit the full pressure developed by said pump to enter said hydraulic mechanism, whereby the pitch of said blades is varied to a determined angle, and operable in a second position to seal said fluid in said hydraulic mechanism holding said blades at said determined angle, and operable in a third position to permit fluid to enter said hydraulic mechanism; a governor connected for operation at a speed proportional to the propeller speed; and valve means operated by said governor for controlling the pressure of fluid passing through said manually controlled valve means to said hydraulic mechanism, when in said third position, and thus automatically controlling the pressure exerted on said blades to vary their pitch.

18. The combination with a variable pitch propeller having blades adapted to swivel to vary their pitch, a hydraulic device operatively connected to said blades and operable to vary and fix the position of said blades about their longitudinal axes, means operatively connected to the engine for producing hydraulic pressure, conduit means connecting said pressure producing means to said hydraulic device, and pressure intensifying means having a plurality of cylinders and pistons of varied dimensions, operable to multiply by a determined factor the pressure transmitted to said hydraulic device.

19. The combination with a variable pitch propeller having blades adapted to swivel to vary their pitch, a hydraulic device operatively connected to said blades and operable to vary and fix the position of said blades about their longitudinal axes, means operatively connected to the engine for producing hydraulic pressure, conduit means connecting said pressure producing means to said hydraulic device, and pressure intensifying means having a plurality of cylinders and co-operative pistons of varied dimensions connected in series, operable to multiply by a determined factor the pressure transmitted to said hydraulic device.

20. Driving mechanism for aircraft, comprising: a propeller having blades adapted to swivel to vary their pitch; a motor to drive said propeller; hydraulic mechanism associated with the propeller for varying the pitch of its blades; a hydraulic pump operatively connected to said motor and operating to produce hydraulic pressure to operate said hydraulic mechanism; means for transmitting to said hydraulic mechanism the hydraulic pressure produced by said pump, and comprising: manually controlled valve means operable in a first position to permit the full pressure developed by said pump to enter said hydraulic mechanism, whereby the pitch of said blades is varied to a determined angle, and operable in a second position to seal said fluid in said hydraulic mechanism holding said blades at said determined angle, and operable in a third position to permit fluid to enter said hydraulic mechanism; automatically controlled valve means for controlling the pressure of fluid passing through said manually controlled valve means to said hydraulic mechanism, when in said third position, and thus automatically controlling the pressure exerted on said blades to vary their pitch; and pressure intensifying means operable to multiply by a determined factor the pressure transmitted to said hydraulic mechanism.

21. The combination with a variable pitch propeller having blades adapted to swivel to vary their pitch, a hydraulic device operatively connected to said blades and operable to vary and fix the position of said blades about their longitudinal axes, means operatively connected to the engine for producing hydraulic pressure, conduit means connecting said pressure producing means to said hydraulic device, and pressure intensifying means having a plurality of aligned cylinders and cooperative aligned pistons of varied dimensions connected together, operable to multiply by a determined factor the pressure transmitted to said hydraulic device.

22. The combination with a variable pitch propeller having blades adapted to swivel to vary their pitch, a hydraulic device operatively connected to said blades and operable to vary and fix the position of said blades about their longitudinal axes, means operatively connected to the engine for producing hydraulic pressure, conduit means connecting said pressure producing means to said hydraulic device, and pressure intensifying means having a plurality of cylinders and cooperative pistons of varied dimensions connected together, said conduit means communicating with one of said cylinders providing inlet and outlet means for said one cylinder, said pressure intensifying means being operable to multiply by a determined factor the pressure transmitted to said hydraulic device.

23. A variable pitch propeller having blades adapted to swivel to vary their pitch, hydraulic mechanism for varying the pitch of said blades, pump means for producing hydraulic pressure to operate said hydraulic mechanism, means for transmitting to said hydraulic mechanism hydraulic pressure produced by said pump means, by-pass means, valve means operable in a first position to permit fluid to enter said hydraulic mechanism at one pressure whereby the pitch of said blades is varied, and operable in a second position to seal said fluid in said hydraulic mechanism holding said blades at a determined angle, and operable in a third position to permit fluid passing through said by-pass means to enter said hydraulic mechanism at a different pressure, whereby the pitch of said blades is varied.

24. A variable pitch propeller having blades adapted to swivel to vary their pitch, hydraulic mechanism for varying the pitch of said blades, hydraulic pressure producing means for operating said hydraulic mechanism, means for transmitting to said hydraulic mechanism the pressure produced by said hydraulic pressure means, and indicating means for indicating the pitch of said blades and the amount of liquid in the system to operate said hydraulic mechanism.

25. A variable pitch propeller, comprising: a hub; blades rotatably supported by said hub for rotation about their longitudinal axes; and a plurality of elongated elements each having a part thereof movably connected to said hub, and having another part thereof movably connected to one of said blades for anchoring said blades to said hub, whereby said elements are movable with respect to each other, to said blades, and to said hub, during rotation of said blades about their longitudinal axes.

26. A variable pitch propeller, comprising: a hub; blades rotatably supported by said hub for rotation about their longitudinal axes; studs operatively connected to said blades and to said hub; means rotatably mounted on said studs; and a plurality of elongated elements, having parts thereof connected to said rotatably mounted means on said hub and on said blades for anchoring said blades to said hub, whereby said elements are movable with respect to each other, to said blades, and to said hub, during rotation of said blades about their longitudinal axes.

27. A variable pitch propeller having blades adapted to swivel to vary their pitch, hydraulic mechanism for varying the pitch of said blades, pump means for producing hydraulic pressure to operate said hydraulic mechanism, by-pass means, valve means operable in a first position to permit substantially the full pressure developed by said pump means to enter said hydraulic mechanism, whereby the pitch of said blades is varied to a determined angle, and operable in a second position to seal said fluid in said hydraulic mechanism, holding said blades at said determined angle, and operable in a third position, to permit fluid passing through said by-pass means to enter said hydraulic mechanism at a different pressure, whereby the pitch of said blades is varied to a determined angle, and automatically controlled valve means for controlling the pressure of fluid passing through said first mentioned valve means to said hydraulic mechanism, and thus automatically controlling the pressure exerted on said blades to vary their pitch.

28. A variable pitch propeller having blades adapted to swivel to vary their pitch, hydraulic mechanism for varying the pitch of said blades, pump means for producing the hydraulic pressure to operate said hydraulic mechanism, automatically controlled means for controlling the pressure of fluid entering said hydraulic mechanism, whereby the pitch of said blades is automatically varied to a determined angle, and valve means operable to cut off the supply of fluid to said automatically controlled means.

29. A variable pitch propeller having blades adapted to swivel to vary their pitch, hydraulic mechanism for varying the pitch of said blades, pump means for producing hydraulic pressure to operate said hydraulic mechanism, valve means operable to permit fluid to enter said hydraulic mechanism for varying the pitch of said blades, automatically controlled means for automatically controlling the pressure of fluid entering said hydraulic mechanism, and valve means operable to cut off the flow of fluid to said automatically controlled means.

30. A variable pitch propeller having blades adapted to swivel to vary their pitch, hydraulic mechanism for varying the pitch of said blades, pump means for producing hydraulic pressure to operate said hydraulic mechanism, by-pass means, valve means operable in a first position to permit substantially the full pressure developed by said pump means to enter said hydraulic mechanism, whereby the pitch of said blades is varied to a determined angle, and operable in a second position to seal said fluid in said hydraulic mechanism, holding said blades at said determined angle, and operable in a third position, to permit fluid passing through said by-pass means to enter said hydraulic mechanism at a different pressure, whereby the pitch of said blades is varied to a determined angle, automatically controlled valve means for controlling the pressure of fluid passing through said first mentioned valve means to said hydraulic mechanism, and thus automatically controlling the pressure exerted on said blades to vary their pitch, and manually controlled valve means operable to cut off the supply of fluid to said automatically controlled valve means.

31. A variable pitch propeller having blades adapted to swivel to vary their pitch, fluid actuated mechanism for varying the pitch of said blades, means for producing fluid pressure, fluid influenced means for transmitting the pressure produced by said pressure producing means to said fluid actuated mechanism, a first body of fluid being normally confined between said fluid influenced means and said pressure producing means, a second body of fluid being normally confined between said fluid influenced means and said fluid actuated mechanism, whereby the pressure produced by said pressure producing means is transmitted from said first body of fluid to said second body of fluid by said fluid influenced means, to effect operation of said fluid actuated mechanism to thus vary the pitch of said blades.

32. A variable pitch propeller having blades adapted to swivel to vary their pitch, fluid actuated mechanism for varying the pitch of said blades, means for producing fluid pressure, fluid influenced means for transmitting the pressure produced by said pressure producing means to said fluid actuated mechanism, a first body of fluid being normally confined between said fluid influenced means and said pressure producing means, a second body of fluid being normally confined between said fluid influenced means and said fluid actuated mechanism, said fluid influenced means forming a closed fluid system therebetween and said fluid actuated mechanism, preventing flow of fluid therepast into said first body of fluid, whereby the pressure produced by said pressure producing means is transmitted from said first body of fluid to said second body of fluid by said fluid influenced means, to effect operation of said fluid actuated mechanism to thus vary the pitch of said blades.

33. A variable pitch propeller having blades adapted to swivel to vary their pitch, fluid actuated mechanism for varying the pitch of said blades, means for producing fluid pressure, fluid influenced means for transmitting the pressure produced by said pressure producing means to said fluid actuated mechanism, a first body of fluid being normally confined between said fluid influenced means and said pressure producing means, a second body of fluid of constant volume being normally confined between said fluid influenced means and said fluid actuated mechanism, whereby the pressure produced by said pressure means is transmitted from said first body of fluid to said second body of fluid by said fluid influenced means, to effect operation of said fluid actuated mechanism to thus vary the pitch of said blades.

34. A variable pitch propeller having blades adapted to swivel to vary their pitch, fluid actuated mechanism for varying the pitch of said blades, means for producing fluid pressure, fluid influenced means for transmitting the pressure produced by said pressure producing means to said fluid actuated mechanism, a first body of fluid being normally confined between said fluid influenced means and said pressure producing means, a second body of fluid being normally confined between said fluid influenced means and said fluid actuated mechanism, whereby the pressure produced by said pressure means is transmitted from said first body of fluid to said second body of fluid by said fluid influenced means, to effect operation of said fluid actuated mechanism to thus vary the pitch of said blades, and automatically controlled means for controlling the pressure of fluid in said first body of fluid.

35. A variable pitch propeller having blades adapted to swivel to vary their pitch, fluid actuated mechanism for varying the pitch of said blades, means for producing fluid pressure, fluid influenced means for multiplying at a determined factor the pressure produced by said pressure producing means, and for transmitting said multiplied pressure to said fluid actuated mechanism, a first body of fluid being normally confined between said fluid influenced means and said pressure producing means, a second body of fluid being normally confined between said fluid influenced means and said fluid actuated mechanism, whereby the pressure produced by said pressure means is transmitted from said first body of fluid to said second body of fluid by said fluid influenced means, to effect operation of said fluid actuated mechanism to thus vary the pitch of said blades.

ALBERT P. WIEGAND.

CERTIFICATE OF CORRECTION.

Patent No. 1,987,651.                          January 15, 1935.

ALBERT P. WIEGAND.

It is hereby certified that error appears in the printed specification of the the above numbered requiring correction as follows: Page 6, first column, line 48, claim 2, after "means" insert the comma and words , independent of said motor,; and that the said Letters Patent should be read with this correction therein that the same may conform to the record of the case in the Patent Office.

Signed and sealed this 19th day of March, A. D. 1935.

Leslie Frazer (Seal)                                 Acting Commissioner of Patents